United States Patent [19]

Harr

[11] 3,832,577

[45] Aug. 27, 1974

[54] THRESHOLD EXTRACTION CIRCUITRY FOR NOISY ELECTRIC WAVEFORMS

[75] Inventor: Jerome Danforth Harr, San Jose, Calif.

[73] Assignee: International Business Machines Corporation, Armonk, N.Y.

[22] Filed: June 22, 1973

[21] Appl. No.: 372,713

[52] U.S. Cl. ............. 307/235 A, 328/117, 328/151, 328/162, 328/165

[51] Int. Cl. ............................................ H03k 5/20

[58] Field of Search .............. 328/114.7, 151, 162.3, 328/165; 307/235 R, 235 A

[56] References Cited

UNITED STATES PATENTS

| | | | |
|---|---|---|---|
| 3,524,994 | 8/1970 | Ritter | 328/117 X |
| 3,530,385 | 9/1970 | Smith et al. | 328/116 |
| 3,609,407 | 9/1971 | Garuts | 328/115 X |

*Primary Examiner*—John Zazworsky

[57] ABSTRACT

Significant low frequency noise components in an electric wave, likely to follow larger transient components, are accommodated by automatically adjusting threshold crossing extraction circuitry. Peak component values of each cycle of a wave are stored and used in adjusting the threshold for the succeeding cycle of that wave. The peak level of each mark signal and that of each space signal component is stored by circuitry closely tracking the pertinent changes in the wave envelope. This circuitry is automatically adjusted rapidly at the beginning of each cycle and thus provides control of threshold adjustment without delay under widely varying conditions, such as are encountered in hand scanning of bar coding and the like. Facile circuitry comprises capacitive negative and positive peak tracking and storing circuits interconnected by a resistance divider network from which the threshold value is extracted for application to a signal comparator circuit in which the threshold signal is derived. Output of the comparator circuit is applied to the tracking circuits for arming them. The input signal is differentiated for enabling the tracking and storing circuits alternately in accordance with the sign of the signal wave slope. Reset circuitry is arranged for maintaining operation within the normal range.

15 Claims, 8 Drawing Figures

THRESHOLD EXTRACTION CIRCUITRY FOR NOISY ELECTRIC WAVEFORMS

The invention is directed to electronic circuitry for accepting low values of current such as are generated in photosensitive devices and which are apt to have significant low frequency noise components, frequently following larger transient components, and thereafter processing these currents for producing a clean digital level output free from the effects of these noise transients.

The processing of such currents has long been known in the prior art; however, circuitry for eliminating the effects of the transients has not been as successful as that of the invention.

The examples of such prior art circuitry are given in the following U.S. Pat. Nos.:

| | | | |
|---|---|---|---|
| 2,999,925 | 9/1961 | Thomas | 250-8 |
| 3,159,815 | 12/1964 | Groce | 340-146.3 |
| 3,303,329 | 2/1967 | Fritz | 235-61.11 |
| 3,398,373 | 8/1968 | Caswell | 328-163 |
| 3,560,751 | 2/1971 | Buettner et al | 250-214 |
| 3,566,281 | 2/1971 | Baumann | 328-171 |
| 3,691,660 | 11/1971 | Rugo | 307-264 |

All of the arrangements disclosed in these prior art patents rely on predetermined, controlled capacitor discharge rates to enable the threshold to follow the envelope changes. If the discharge rate is too slow, the threshold will not follow the envelope change, and if it is too fast, it will not yield a stable accurate threshold. The patent to Baumann is most pertinent in that it describes an arrangement for following the signal cycle by cycle to produce very accurate clipping levels. However, this circuit is based on delaying the incoming signal wave while the theshold is extracted. Because a predetermined delay time must be used, the circuit is limited to waveforms having predetermined rise and fall times, which precludes use in hand scanning operations and like applications. Therefore, none of these patents show circuitry capable of operating properly over widely varied input data rates such as are encountered in hand scanning of optically and magnetically recorded data.

The objects indirectly referred to hereinbefore and those that will appear hereinafter are attained by threshold extraction circuitry according to the invention comprising a comparator circuit having input circuit terminals to which an input electric wave is directly applied, further input circuit terminals to which a thresholding level is applied, and output circuit terminals at which a thresholded output electric wave is presented. A pair of electric state manifestive circuits are arranged to develop and store the peak positive and negative electric states encountered with reference to the input wave. The output levels of the manifesting circuits are reduced to a threshold level in an algebraic summing circuit having output circuit terminals coupled to the further input circuit terminals of the comparator circuit. The manifesting circuits are alternately armed and enabled by application of the output electric wave in proper polarity and in accordance with the slope of the input electric wave. An electric wave differentiating circuit is arranged for determining the sign of the input electric wave slope and the bipolar output thereof is connected to the input circuit terminals of the charge storing circuits. Further, according to the invention, there is a comparing circuit interposed between the differentiating circuit and the manifesting circuits with a reference input circuit terminal connected to a point of fixed reference potential, normally ground, for deriving a bistatic wave representing the sign of the slope. Preferably a reset pulse generating circuit is interposed in the circuitry for forcing the manifesting circuits into normal operation in the event they are effectively disabled by a large transient or some faulty scanning operation.

In order that full advantage of the invention may be obtained in practice, a preferred embodiment thereof, given by way of example only, is described in detail hereinafter with reference to the accompanying drawing, forming a part of the specification, and in which.

Figure 1:
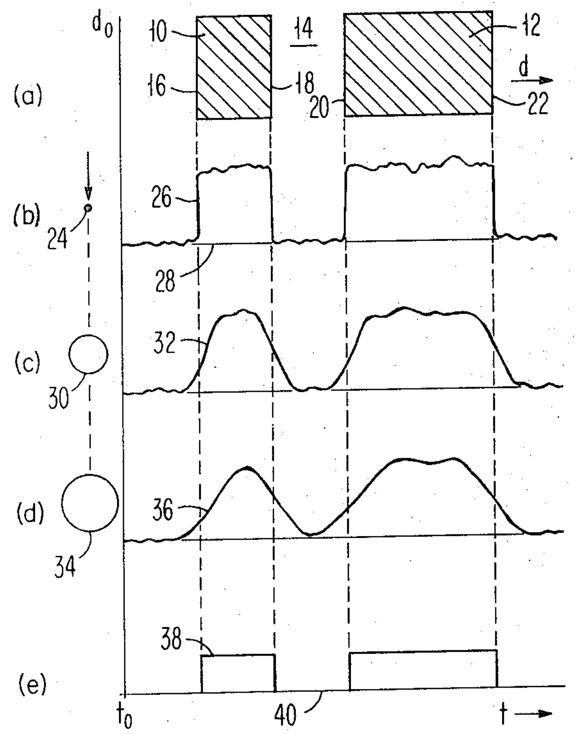
FIG. 1 is a common time reference graphical representation of the effect of aperture size on photoresponsive device current wave forms.

The timing diagram of FIG. 1 graphically presents a fundamental aspect of scanning with which the invention is concerned. At FIG. 1(*a*) there is shown a pair of bars 10 and 12 separated by a space 14 as might represent binary value 1 on a document in either retrospective pulse modulation (RPM) or pulse rate modulation (PRM) bar coding of the transition significant varity. A description of RPM will be found in U.S. Pat. No. 3,708,748 issued on the 2nd day of Jan., 1973, to Ernie George Nassimbene for "Retrospective Pulse Modulation and Apparatus Therefor." Similarly PRM is described in copending U.S. Pat. Application Ser. No. 287,132 of William Arnold Boothroyd, filed on the 7th day of September, 1972, for "Demodulating Circuitry for Pulse Rate Modulation Data Reproduction." The optical scanning mechanism must be designed to detect the transitions 16, 18, 20, and 22. Electronic circuitry responding to scanning means of an optical aperture stop 24 which is quite small with respect to the width of the smaller bar 10 will produce a waveform as shown by the curve 26, portions of which lie ideally along the reference level line 28 as shown in FIG. 1(*b*). For an aperture stop 30, which is approximately one half the width of the smaller bar 10, a waveform shown by the curve 32 will obtain as shown in FIG. 1(*c*). Similarly, an aperture stop 34 of approximately the same width as the smaller bar 10 produces a waveform as shown by the curve 36 in FIG. 1(*d*). A curve 38, having portions lying on the reference level line 40 shown in FIG. 1(*e*) represents a reduction of data to the ideal pulse waveform desired. While the curve 26 appears to provide the desired result directly, the signal-to-noise ratio is very low because of the small size aperture stop 24. Such small aperture stops can sense the individual fibers of the paper of a document as well as small spots and smudges. The signal-to-noise ratio is increased with the larger aperture stop, resulting also in less sensitivity to irregularities in the printing and the paper. However, it can be readily seen that the transitions 16, 18, 20, and 22 are much harder to determine both visually and electronically. It is fundamental that when the system optical aperture stop is centered on the edge of a mark, half of the light passing the aperture stop is being attenuated by the mark while the other half is being reflected by the background which is opposite to the characteristics of the mark as much as is possible, all other conditions also being considered, of course. As the aperture stop moves entirely onto the mark, all of the reflected light will undergo attenuation to the maximum. Hence, the edge of a mark can be determined as that point where the excursions of the waveform are half-way between the most negative excursions and the most positive excursions. A glance at FIG. 1 will confirm this.

Figure 2:
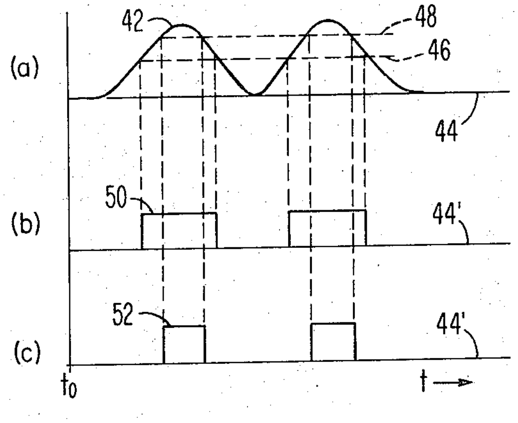
FIG. 2 is a common time reference graphical representation of the effects of threshold level on digital output.

FIG. 2 graphically illustrates the effect of threshold value on ideal digital output. At FIG. 2(*a*) curve 42 represents the output of a photoelectric system responding to a relatively large size optical aperture stop. One value of the threshold voltage is represented by the distance from the reference potential level line 44 and a dashed line 46; a higher threshold potential value is represented by the distance between the line 44 and another dashed line 48. At FIG. 2(*b*) a curve 50, portions of which merge with the reference level line 44', represents an ideal digital output obtained with the lower value of threshold potential. Similarly at FIG. 2(*c*) the curve 52, portions of which likewise merge with the reference level line 44'', represents the ideal digital output obtained with the higher threshold level represented by the line 48. At a glance, it can be seen that the ratio of roughly 2:1 readily may result from threshold potentials not too greatly different from each other. This effect is quite important in the practical application, for in many applications, inappropriate threshold levels will render the system useless.

Figure 3:
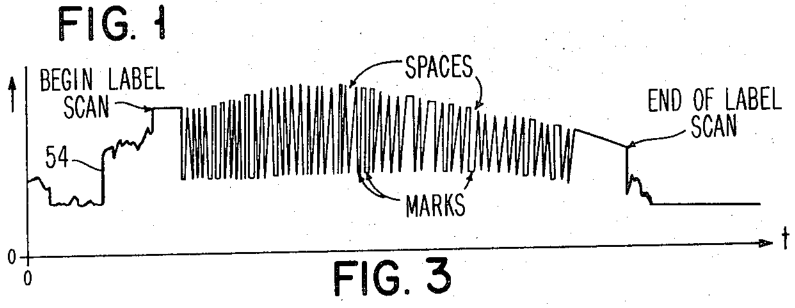
FIG. 3 is a graphical representation of photoresponsive current against time for an example of a label.

Such effects are readily appreciated upon an inspection of a waveform of a typical application. In FIG. 3 there is a curve 54 traced on the faceplate of an oscilloscope connected to an operating bar coding scanning system for reproducing information encoded on a simple label. In this particular application the label was tilted with respect to the photo-responsive scanning device causing the upward sweep to the envelope which can readily be seen by inspection. A similar waveform obtains when a label is scanned by a modulated laser beam and the background illumination contributes a 60 Hz component due to the use of fluorescent lighting. It can readily be seen that there is no fixed value of threshold voltage that will be satisfactory for all of the marks and spaces represented; the threshold level must be continually adjusted to lie near the center of the envelope.

Figure 4:
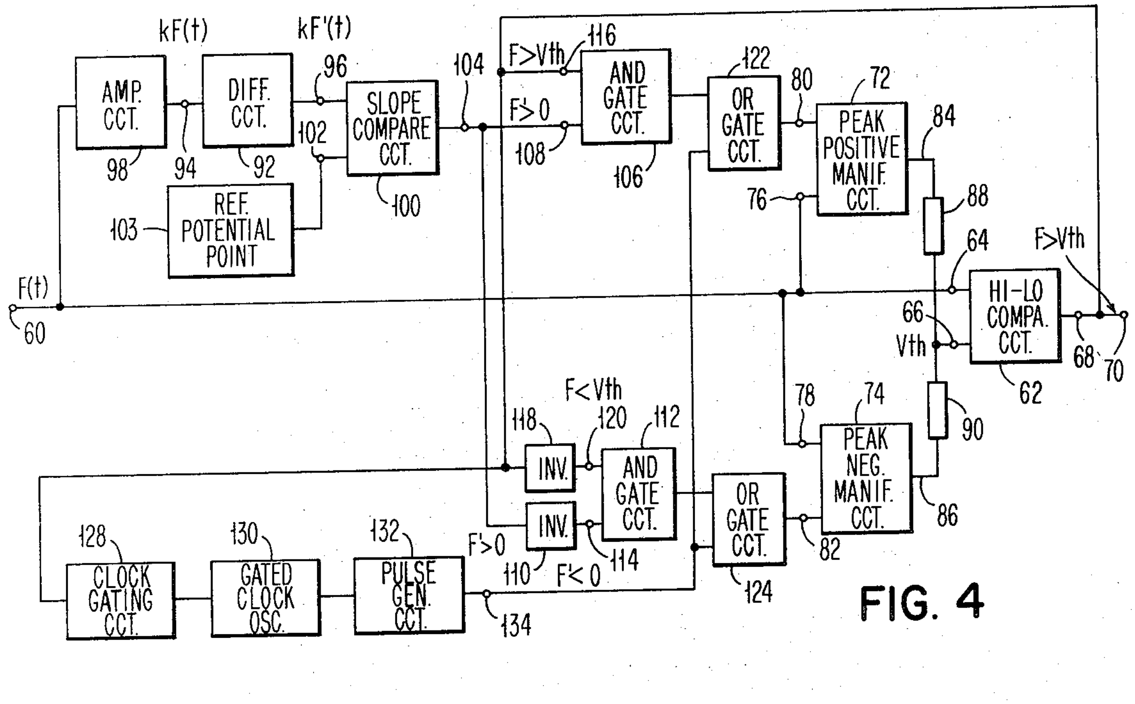
FIG. 4 is a functional diagram of circuitry according to the invention.

A functional diagram of circuitry for carrying out the thresholding extraction process according to the invention is shown in FIG. 4. An electric wave requiring thresholding is applied to input electric wave terminals 60 and thereafter applied to a comparator circuit 62 at one set of input terminals 64. The comparator circuit 62, to be more fully described later, has additional input circuit terminals 66 and output terminals 68, the latter of which are connected to output electric wave terminals 70. Threshold potential for application to the input circuit terminals 66 is provided by circuitry comprising two electric state manifesting circuits 72 and 74, to be described more fully hereinafter. The manifesting circuits 72 and 74 have input circuit terminals 76 and 78 respectively, both of which are connected to the input circuit terminals 64 of the comparator circuit 62. The manifesting circuits also have control circuit terminals 80 and 82 and output circuit terminals 84 and 86 respectively. Potential proportioning circuitry, shown as comprising impedors 88 and 90 connected in series to the output terminals 84 and 86 and the junction between the impedors is connected to the input circuit terminals 66 of the comparator circuit 62. The principle control signal applied to the control circuit terminals 80 and 82 of the manifesting circuits 72 and 74 is derived in a differentiating circuit 92. The circuit 92 has input terminals 94 and output terminals 96. Preferably, an amplifying circuit 98 is interposed between the input electric wave terminals 60 and the input terminals 94 of the differentiating circuit 92. This control signal essentially depends on change in sign of the slope of the input electric wave. It should be recognized that simple differentiation will suffice for some applications wherein the various parameters are favorable. Preferably, however, the differentiating circuit 92 is followed by a comparing circuit 100 having input circuit terminals connected to the terminal 96 and other input circuit terminals 102 for connection to a point of fixed reference potential, shown here in general as a potential source 103. Output circuit terminals 104 of the comparing circuit 100 are connected to an AND gating circuit 106 at input terminals 108 and coupled by means of an inverting circuit 110 to an AND gating circuit 112 at input circuit terminals 114. Output terminals 68 of the comparator circuit 62 are connected at terminals 116 of the AND gating circuit 106 and coupled by means of an inverting circuit 118 to the input terminals 120 of the AND gating circuit 112. The AND gating circuits 106 and 112 are individually coupled to the manifesting circuits 72 and 74 by means of OR gating circuits 122 and 124, the output circuits of which are connected to the control circuit terminals 80 and 82 respectively.

There are times as will be described later when it is desired to force a reset of the electric state manifesting circuits 72 and 74. This is accomplished by reset pulse generating circuitry comprising a monostable pulsing circuit 128, a gated clock oscillator 130 and a monostable pulse generating circuit 132 all connected in series between the output terminals 68 of the comparator 62 and the OR gating circuits 122 and 124.

Figures 5, 6:
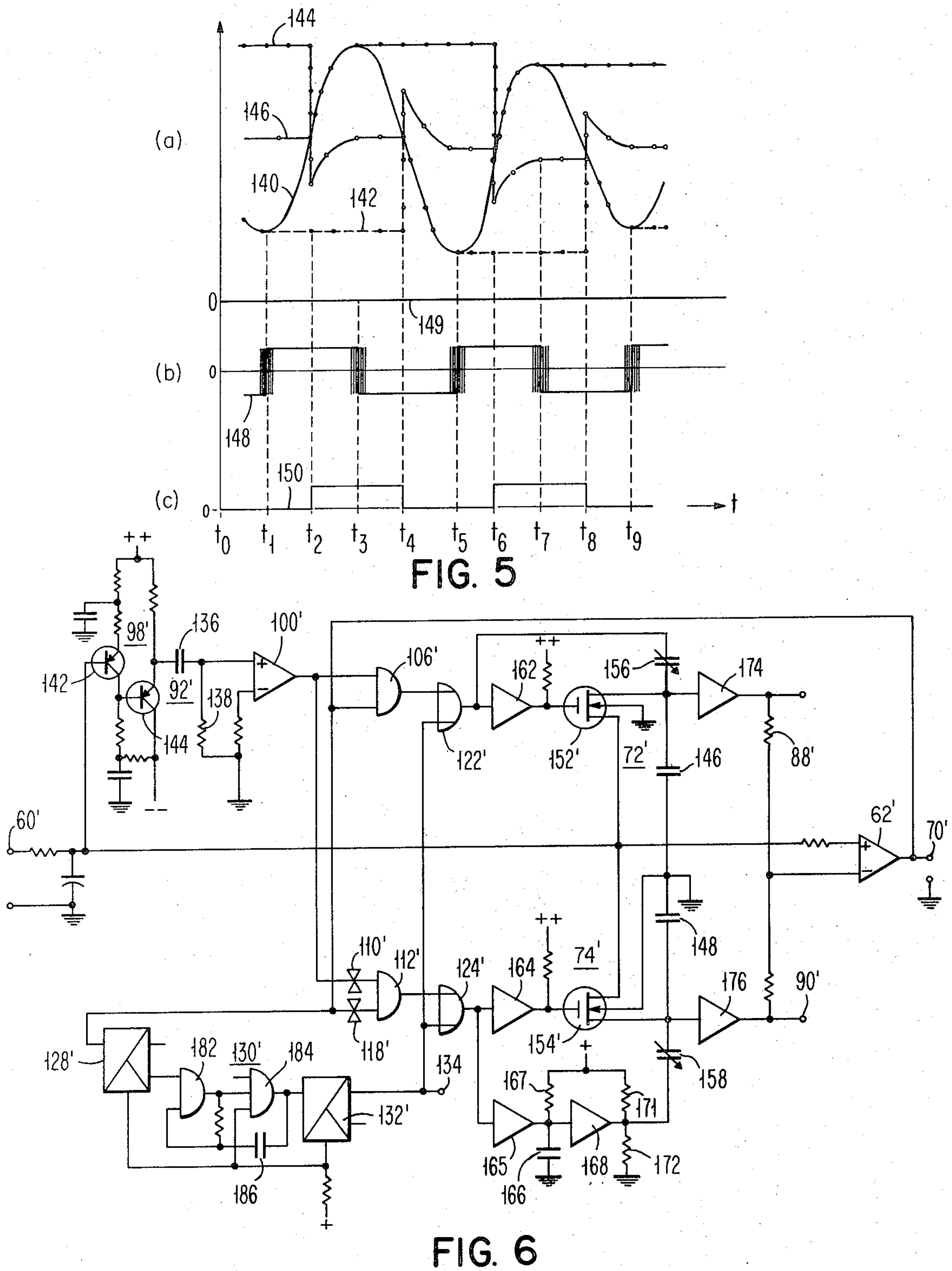
FIG. 5 is a common time reference graphical representation of waveforms obtained with the circuitry of FIG. 4.
FIG. 6 is a schematic diagram of one embodiment of the invention as set forth in FIG. 4.

The operation of the above described circuitry will readily be understood by reference to FIG. 5 which is a single timing diagram fixing the time relationship between various waveforms. At FIG. 5(*a*) there is shown a curve 140 which represents a wave, which approximates a sinusoidal wave, which wave is that applied to the input terminals 60. The negativemost value of that wave, which is stored in the manifesting circuit 74, is represented by the curve 142, portions of which follow the curve 140 as shown. Likewise, a curve 144 shows the positivemost values which are stored in the manifesting circuit 72, portions of which curve likewise follow portions of curve 140. The threshold voltage developed is represented by a curve 146 which in the examples given, lies midway between curves 142 and 144 as shown. At FIG. 5($b$) there is shown a curve 148 which represents the output voltage at the terminal 104 of the comparing circuit 100. The output of the comparator circuit 62 is represented by the curve 150 at FIG. 5($c$). With the usual label having a relatively light, highly reflecting background and relatively dark printed characters or bars, the output of the photosensitive device is relatively positive when the background is being traversed and that output goes negative when a mark is traversed. It should be recognized, of course, that the circuitry according to the invention is readily adapted for light marks against a relatively dark background, if such is desired. As the photosensitive device is moved across the document or label, theoretically a relatively high output will be established initially above any threshold value that may appear at the threshold input terminals 66 of the high-low comparator circuit 62. As the photoresponsive device passes over a mark, the output will drop due to absorption of some of the light normally reflected. A threshold voltage is then generated in proportion to the ratios of the impedors 88 and 90. The overall circuit arrangement will then settle down at the first mark on the document. In FIG. 5, the output of the photoresponsive device is represented by curve 140, which at the time $t_1$ is at a minimum indicating that the photosensitive device is centered over a mark. At this time, the output of the differentiating circuit 92 changes sign in the conventional manner. This change of sign is applied according to the invention to the peak negative state manifesting circuit 74 to hold this minimum value as shown by the curve 142. Preferably this control is affected through a slope comparing circuit 100 having an output state represented by the curve 148. Between the times $t_1$ and $t_2$ both state manifesting circuits 72 and 74 are in the holding condition as indicated. The threshold, as represented by the curve 146, is midway between the two holding values of the manifesting circuits where the ratio of the impedors 88 and 90 is 1:1. Other ratios may be used as the application requires, but the description of the circuitry here and after will assume the 1:1 ratio throughout. At the time $t_2$ the output of the comparator circuit 62 changes sign which causes the value in the positive state manifesting circuit 72 immediately to drop to the value of input voltage on the terminal 60 and thereafter track the output of the photosensitive device as shown by the curve 144 superimposed on the curve 140. Immediately, the threshold value drops sharply, but begins to increase as the value in the positive state manifesting circuit increases and rises to a new value for the next half cycle (here the threshold value is the same as the original value because the waveform is the same). At this time, $t_3$, the sign of the differentiating circuit output 92 again changes resulting in the change to curve 148 as shown. This change of sign of the derivative causes the positive state manifesting circuit to stop following the input waveform 140 as it starts a negative excursion. The transitions in the curve 148 may occur over a small range of time values without adverse affect on the operation of the overall circuitry. At the time $t_2$ the output of the high-low comparator circuit 62 is brought up and is held there until time $t_4$ at which time the sign of the comparator circuit 62 again reverses causing the negative state manifesting circuit 74 now to track the input electric wave represented by the curve 140 as shown. The threshold voltage as represented by the curve 146 now increases and thereafter decreases to establish a new substantially constant value at the time $t_5$ (which value is different from the previous value). This cycle of events is repeated throughout the operation of the overall circuitry. It is desirable that the output wave of the high-low comparator circuits 62, as represented by the curve 150, have transitions at the more precise points in time and the differentiating process is enhanced in this respect by the use of the slope comparing circuit 100 working against a point of fixed reference potential, which in most applications will be ground potential. With reference to FIG. 5($a$) it is seen that the value of the threshold voltage as represented by the curve 146, is established partially during the preceding cycle and partially during the instant cycle of operation and more particularly on the preceding quarter cycle and the immediately succeeding quarter cycle of each half cycle of operation which provides for a highly effective markspace sensing operation.

As indirectly mentioned earlier, the scanning of highly reflective documents may result in the input electric wave momentarily swinging to a large value. The effect of such a transient is to maintain one of the electric state manifesting circuits at a value far removed from normal operating level. This will cause the threshold voltage to swing far enough away from normal threshold levels that the analog input electric wave cannot cross the threshold value as marks and spaces are being scanned. If the threshold level is not crossed, the over value of an electric state manifesting circuit will not be reset and the system will not be able to recover from this situation. According to the invention, recovery is forced whenever necessary. The circuitry according to the invention is arranged so that reset is forced in the absence of threshold crossings. If the threshold voltage value is not being met regularly, the system will not be operating either because the photosensitive devices are not scanning a label or the threshold is set too far from the proper level. In either case, the system is reset by the addition of simple circuitry.

The reset generator according to the invention measures only the time between the successive positive threshold crossings, and if no crossing occurs for a predetermined period of time, a reset pulse is generated at appropriate intervals until a positive crossing does occur. This reset pulse is applied both to the positive and to the negative electric state manifesting circuits forcing them to track the input signal for the duration of the reset pulse. The requirements for this generator will be given in greater detail hereinafter in connection with the operation of the circuit arrangements specifically shown in FIG. 6. This schematic diagram follows the functional diagram hereinbefore described so that component circuits are identified by the same reference numeral primed.

The electric state manifesting circuits 72′ and 74′ require an analog signal of moderate swing. However, the differentiating circuit 92′ comprising a capacitor 136 and a resistor 138 as shown, requires a larger signal in order to accommodate as large a range of input signal amplitude as possible. The amplifying circuit 98′ comprises a pair of transistors 142 and 144 connected in a conventional high gain circuit configuration. The electric state manifesting circuits 72′ and 74′ as given here comprise capacitors 146 and 148 as electric charge storage components. In most practical applications capacitors for storing electric charges indicating the pertinent electric state will be chosen by the circuit designer, but it is contemplated according to the invention that inductors connected in suitable alternative circuitry will be used if desired. Another alternate embodiment, particularly useful with high-speed circuitry, contemplates the use of a simple cathode ray tube having a rather slow decaying phospher, such as is used in signal strength indicating devices and the like, together with optical readout circuitry for developing the threshold voltage in accordance with the degree of excitement of the phospher as sensed by a suitable photosensitive device.

The capacitors 146 and 148 are charged and discharged by field effect transistors (FET) 152' and 154' respectively. The source electrodes of the FET are connected to the electric wave input terminals 60'. The gate electrodes are connected to inverting OR gating circuits 122' and 124' through inverters 162 and 164 respectively, while the drain electrodes are connected to the storage capacitors 146 and 148 respectively. When either of the FET in this circuit arrangement is turned off, the sudden gate electrode swing is partially coupled through the transistor and the ever present stray capacitive elements into the storing capacitor. This offset is compensated for by coupling in a transient of the opposite polarity by means of adjustable capacitors 156 and 158. The compensating transition for the positive electric state manifesting circuit 72' is obtained from the output of the OR gating circuit 122' ahead of an inverting amplifying circuit 162. With this circuit arrangement the compensating transition is applied before the gate transition is applied to the FET 152'. A similar inverting amplifying circuit 164 is in circuit with the negative electric state manifesting FET 154'. When the input electric wave is going in the negative direction, the compensating transition is delayed by a delay circuit shown as comprising an inverting circuit 165, a capacitor 166, a resistor 167, and an inverting circuit 168 with a resistance divider circuit comprising resistors 171 and 172 forcing the output voltage. The reason for this delay is that several cycles of oscillation would have been started had the threshold voltage gone positive enough to overtake the input analog signal and turn off the comparator circuit 62'. Amplifying circuits 174 and 176 are arranged to buffer the threshold voltage deriving circuits for preventing unwanted transients from reaching the hi-lo comparator circuit 62'. When the FET's are turned off to enter the holding mode, the compensating transition for the positive charge storing circuit is applied while the controlling FET 152 is still conducting, while that for the negative charge storing circuit is applied just after the FET 154 has been turned off. Because of this, part of the compensating charge dumped on to the charge storing capacitor 146 will be discharged through the moderately low resistance of the FET 152 as it is conducting before it can be turned off to present a high enough resistance to prevent discharge. Thus, the compensating capacitor 156 must be larger for proper compensation because it is a function of the gate-to-source threshold voltage of the FET 152. If the gate-to-source voltage of the FET 152 changes due to age or a change in back gate bias, the amount of compensation must also be changed accordingly.

The reset pulse generating circuit as shown in FIG. 6 comprises a pair of AND gating circuits 182 and 84, regeneratively connected by a capacitor 186. Positive transitions at the output of the hi-lo comparative circuit 62' are applied to the monopulsing circuit 128'. The inverse output terminals of the monopulsing circuit 128' are connected to the AND gating circuit 182 for preventing oscillation of the circuit 130' for the stable period of the pulsing circuit. If no threshold crossing occurs for the duration of the period of the monopulsing circuit 128', the gated oscillator circuit 130' is allowed to start producing reset pulses to occur at the predetermined repetition rate of the circuit 130'. These pulses are applied to a second monopulsing or pulse generating circuit 132' which produces a narrow reset pulse for the inherent stable period of the monopulsing circuit 132'. For example, when scanning labels having 17 characters per inch in RPM coding, the intervals between threshold crossing are 3 microseconds and 6 microseconds respectively for narrow and wide periods between transitions. For labels of 9 characters per inch, the corresponding intervals are 6 microseconds and 12 microseconds. For operation on such labels, the reset generator gating circuit is arranged to time positive threshold crossings which must occur at least every 24 microseconds. The monopulsing circuit 128 therefore is arranged to have a stable period of 30 microseconds, the circuit 135 an oscillation period of 20 microseconds, and the monostable reset pulsing circuit 132', a stable period of 1 microsecond, whereby reset pulse applied to the electric state manifesting circuits 72 and 74 forces the circuits to track the input electric wave for 1 microsecond. As stated hereinbefore, the overall circuitry will immediately assume operation on beginning a scan. There is a possibility, however, that the electric state manifesting circuits may have residual manifestation preventing regular recognition of first mark in space. This can be alleviated in some conventional fashion by employing a dummy initial mark and a following space inset from the edge of the label by about 1/10 of an inch. This will cause at least one reset pulse to be applied before valid data scan. Another practice comprises a use of a scanning probe actuator switch for resetting the electric state manifesting circuits. This may be a simple mechanical contact electric switch connected to apply an initial pulse to the monopulsing circuit 132' initially upon actuation, for example, through logical circuitry comprising a conventional level flipping circuit, such as a Schmitt triggering circuit, and an OR gating circuit interposed in the input lead to the reset pulse generating monostable pulsing circuit 132.

Figure 7:
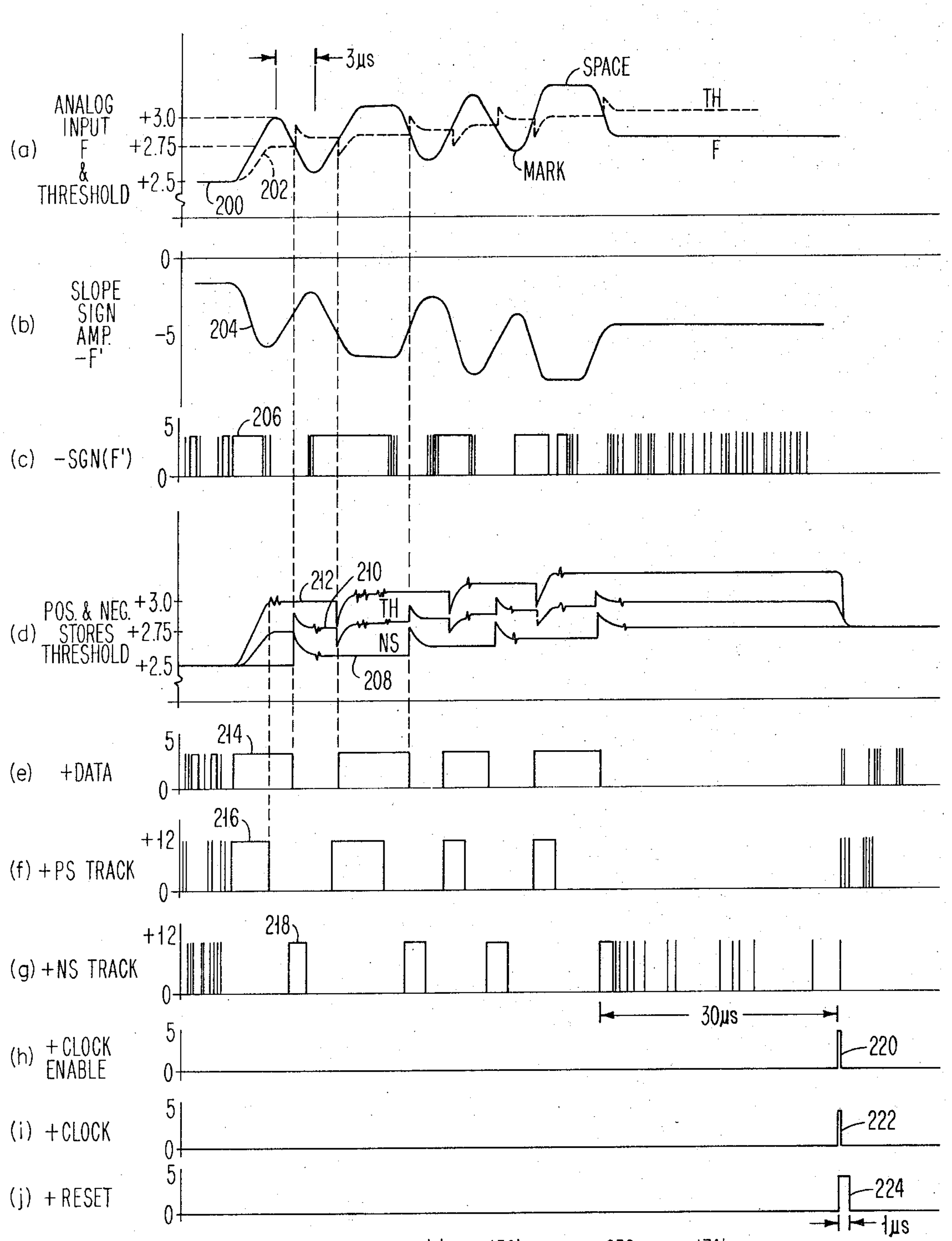
FIG. 7 is a common time reference graphical representation of typical waveforms obtained with the circuitry of FIG. 6.

Waveforms obtained with the circuitry of FIG. 6 are represented by the curves depicted in FIG. 7 on a common time basis. The analog input electric wave at the terminals 60' is represented by a curve 200, the desired threshold level for which is represented by the line 202 in FIG. 7(*a*). The output of the amplifying circuit 98' is represented by the curve 204 at FIG. 7(*b*). After differentiation and processing in the slope comparing circuit 100', the sign of the derivative is represented by the curve 206, portions of which coincide with the zero level line as shown at FIG. 7(*c*). The waveforms resulting from the operation of the negative peak electric state manifesting circuit, the threshold impedance divider circuit and the positive peak electric state manifesting circuit are represented by the curves 208, 210, and 212 respectively at FIG. 7(*d*). Digital output data is represented by the curve 214 at FIG. 7(*e*), while the periods during which manifesting circuits are tracking the input electric wave are represented by curves 216 and 218 at FIGS. 7(*f*) and 7(*g*). The output of the clock gating circuit 128' is represented by the curve 220 at FIG. 7(*h*) and the subsequent pulse wave of the gated clock oscillator 130' is represented by the curve 224 at FIG. 7(*j*). It is understood, of course, that pulses in the last three waveforms do not occur in the absence of transitions in the waveform 214 except after a relatively long period of time as discussed hereinbefore.

Figure 8:
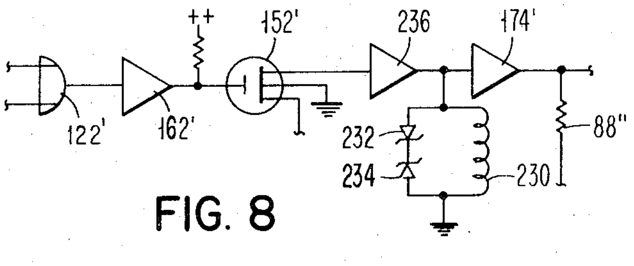
FIG. 8 is a schematic diagram of an alternate electric state manifesting circuit according to the invention.

Alternate circuitry for the electric state manifesting circuit is shown in FIG. 8. The electric state storage circuit comprises an inductance element 230 shunted by a pair of constant voltage diodes 232 and 234. A current driving circuit 236 is coupled to the FET 152' for providing the required current.

While the invention has been shown and described, particularly with reference to a preferred embodiment thereof, and various alternatives have been suggested. It should be understood that those skilled in the art may effect still further changes without departing of spirit and the scope of the invention as defined hereinafter.

The invention claimed is:

1. Threshold extraction circuitry for noisy electric waves, comprising input electric wave terminals, output electric waves terminals, a comparator circuit having input circuit terminals directly connected to said input electric wave terminals, further input circuit terminals and output circuit terminals connected to said output wave terminals, an electric state manifesting circuit for indicating peak positive states having input circuit terminals connected to said input electric wave terminals, control circuit terminals and having output circuit terminals, another electric state manifesting circuit for indicating negative states having input circuit terminals connected to said input wave terminals, control circuit terminals and having output circuit terminals, an algebraic summing circuit having complementary input circuit terminals connected individually to said output terminals of said positive and negative peak electric state manifesting circuits and having output terminals connected to said further input circuit terminals of said comparator circuit, and a control circuit having input circuit terminals coupled to said input electric wave terminals, other input circuit terminals connected to said output circuit terminals of said comparator circuit, and having output circuit terminals coupled to said control circuit terminals of said manifesting circuits, and arranged for decreasing the level of one of said manifesting circuits on a transition of given direction appearing at the output circuit terminals of said comparator circuit and for decreasing the level of the other of said manifesting circuits on a transition of the opposite direction.

2. Threshold extraction circuitry as defined in claim 1 and wherein said control circuitry comprises a differentiating circuit coupled between said input electric wave terminals and said manifesting circuit input circuit terminals.

3. Threshold extraction circuitry as defined in claim 1 and wherein said control circuitry comprises a differentiating circuit coupled to said manifesting circuits by a comparing circuit having input circuit terminals connected to said differentiating circuit output terminals, reference input circuit terminals connected to a point of fixed reference potential, and output circuit terminals coupled to said control circuit terminals of said manifesting circuits.

4. Threshold extraction circuitry as defined in claim 1 and wherein said electric state manifesting circuits each are adjusted in a half cycle of said input electric wave.

5. Threshold extraction circuitry as defined in claim 3 and wherein said control circuitry comprises AND gating circuits having input leads connected individually to said comparing circuits, input leads connected to said output electric wave terminals and output leads connected individually to said input circuit terminals of said electric state manifesting circuits.

6. Threshold extraction circuitry as defined in claim 1 and incorporating a reset pulse generating circuit having input circuit terminals connected to said output electric wave terminals and output circuit terminals coupled to said control circuit terminals of said electric state manifesting circuits.

7. Threshold extraction circuitry as defined in claim 6 and wherein said reset pulse generating circuit coupling comprises OR gating circuits interposed between said differentiating circuit and said generating circuit and said control circuit terminals of said manifesting circuits.

8. Threshold extraction circuitry as defined in claim 1 and wherein said algebraic summing circuit comprises resistive elements.

9. Threshold extraction circuitry as defined in claim 8 and wherein said resistive elements are substantially equal in resistance value.

10. Threshold extraction circuitry as defined in claim 1 and wherein at least one of said electric state manifesting circuits comprises a transistor having an input electrode connected to said input circuit terminals, a common electrode connected to said control circuit terminals and an output electrode connected to said output terminals, and an electric state manifesting component connected between said output electrode and a point of reference potential.

11. Threshold extraction circuitry as defined in claim 10 and incorporating a compensating component connected to said manifesting component at said output electrode.

12. Threshold extraction circuitry as defined in claim 10 and wherein said manifesting component is a capacitor for storing an electric charge.

13. Threshold extraction circuitry as defined in claim 10 and wherein said manifesting component is an inductor for maintaining an electric current.

14. Threshold extraction circuitry as defined in claim 10 and wherein said transistor is a field effect transistor.

15. Threshold extraction circuitry as defined in claim 4 and where the threshold level is developed in the first quarter cycle of each half cycle of said input electric wave.

* * * * *